FIG.:1

Nov. 17, 1970  J. G. BOUILLER ET AL  3,540,221
AIR-SUPPLY CONTROL ARRANGEMENT FOR JET TURBINE ENGINES
Filed Nov. 18, 1968  4 Sheets-Sheet 3
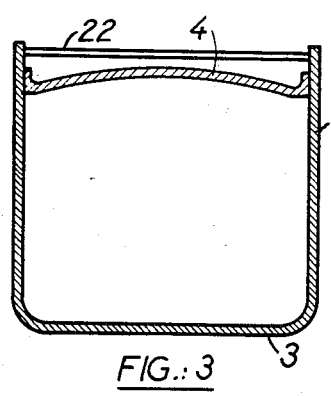
FIG.: 3
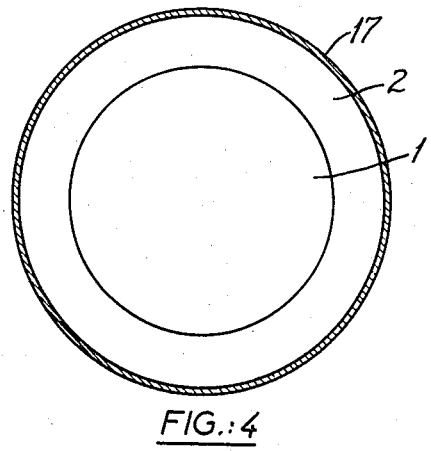
FIG.: 4
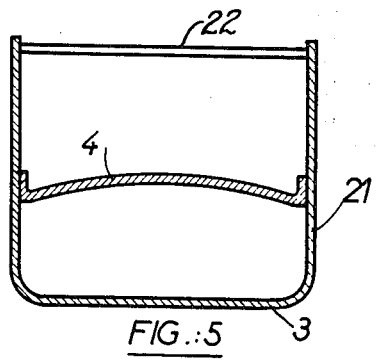
FIG.: 5
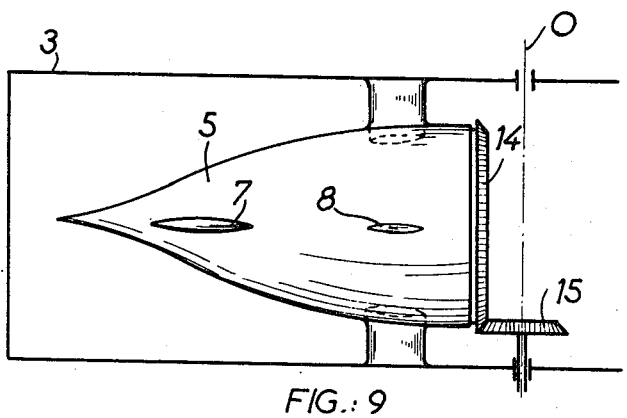
FIG.: 9
Inventors
Jean Georges Bouiller
Raymond Jean Maurice Jouhert
Louis Jules Banger
Armand Jean-Baptiste Lacroix
BY Watson, Cole, Grindle & Watson
Attorneys

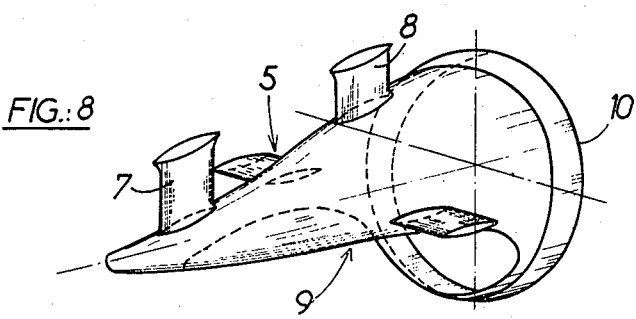
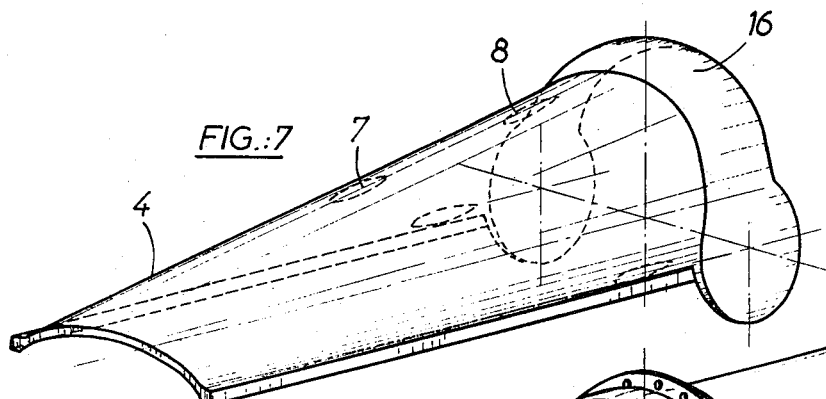
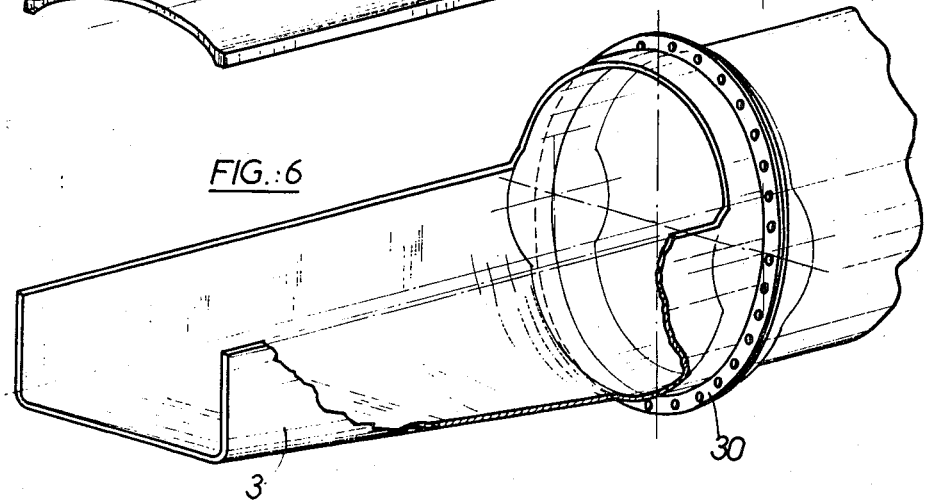

United States Patent Office 3,540,221
Patented Nov. 17, 1970

3,540,221
AIR-SUPPLY CONTROL ARRANGEMENT FOR JET TURBINE ENGINES
Jean Georges Bouiller, Brunoy, Raymond Jean Maurice Joubert, Savigny-sur-Orge, Louis Jules Bauger, Vanves, and Armand Jean-Baptiste Lacroix, Itteville, France, assignors to Societe National d'Etude et de Construction de Moteurs d'Aviation, Paris, France, a company of France
Filed Nov. 18, 1968, Ser. No. 776,605
Claims priority, application France, Nov. 17, 1967, 128,760
Int. Cl. F02k *3/02, 11/00*
U.S. Cl. 60—244                                   9 Claims

ABSTRACT OF THE DISCLOSURE

An arrangement for controlling the supply of air to a jet turbine via a central duct and to a ramjet via an annular duct surrounding the central duct, said arrangement including at the inlet to the central duct a streamlined structure in two parts movable relatively to each other, thereby enabling the supply of air to the jet turbine engine to be completely blocked off when necessary.

---

The invention relates to a powerplant which includes a jet turbine engine combined with a ramjet, and more particularly relates to a control arrangement which enables the powerplant to be given a properly calculated supply of air.

With such combinations, which in aircraft are intended for supersonic flight and in which powerplants with a high compression-ratio, and hence with high speeds of rotation, are made use of, the chief inconvenience resides in the fact that it is only possible to employ the jet turbine engine up to certain speeds, which correspond to a Mach number approximating to 2.6, because thermal constraints, which are a function of the stagnation temperature, do not permit use of this engine for higher speeds. It consequently emerges as a necessity to block off the air-supply to the jet turbine engine so that it will no longer be in use, autorotation being maintained, however, in order to preserve monitoring of certain circuits (lubrication, for example) and the proper behaviour of certain operative structures.

According to the invention, an air-supply control arrangement includes an air-intake casing from which the jet turbine engine is supplied with air via a central duct and the ramjet via an annular duct surrounding the central duct, the inlet to the central duct including two streamlined parts, one of which can be shifted in such a manner as to block off the air-supply duct to the jet turbine engine by cooperating with the other part.

It is preferable that the air-intake casing should comprise a fixed structure and a movable structure the displacement of which is effected by a control member supervised by a Mach number detector. The displacements of the movable structure cause a variation in the cross section of the air-intake casing, in this way ensuring an air-supply which will be adapted to flight conditions, as well as a stable aero-dynamic air-flow which makes it possible to prevent local overpressures and dangerous vibrations.

The fixed part associated with the air-supply duct to the jet turbine engine is preferably rigid with the movable wall belonging to the air-intake casing.

The arrangement according to the invention renders possible a properly calculated operation of the combination of ramjet and jet turbine engine, and this operation can be broken down into three phases:

In the first phase, the jet turbine engine operates alone at a high speed of rotation extending up to a flight speed corresponding to a Mach number approximating to 2.6, In a transitional period, the jet turbine engine and the ramjet are made to operate simultaneously at partial loads, this to give a Mach number situated between 2.6 and 3 approximately, For a Mach number higher than 3, the ramjet operates alone at full thrust, the air-supply to the jet turbine engine being blocked off by the arrangement according to the invention.

The following description relating to the accompanying drawing will indicate by way of nonlimitative example how the invention may be put into effect.

In the drawing:

FIGURE 1 shows diagrammatically in longitudinal section an arrangement in accordange with the invention, the various parts being shown in the position which allows an air supply to the jet turbine engine;

FIG. 2 comprises a view similar to that in FIG. 1, the various parts being shown in the position in which the supply of air to the jet turbine engine is closed off;

FIG. 3 is a cross section taken through the line III—III in FIG. 1;

FIG. 4 is a cross section taken through the line IV—IV in FIG. 1;

FIG. 5 is a cross section taken through the line V—V in FIG. 2;

Figure 1:
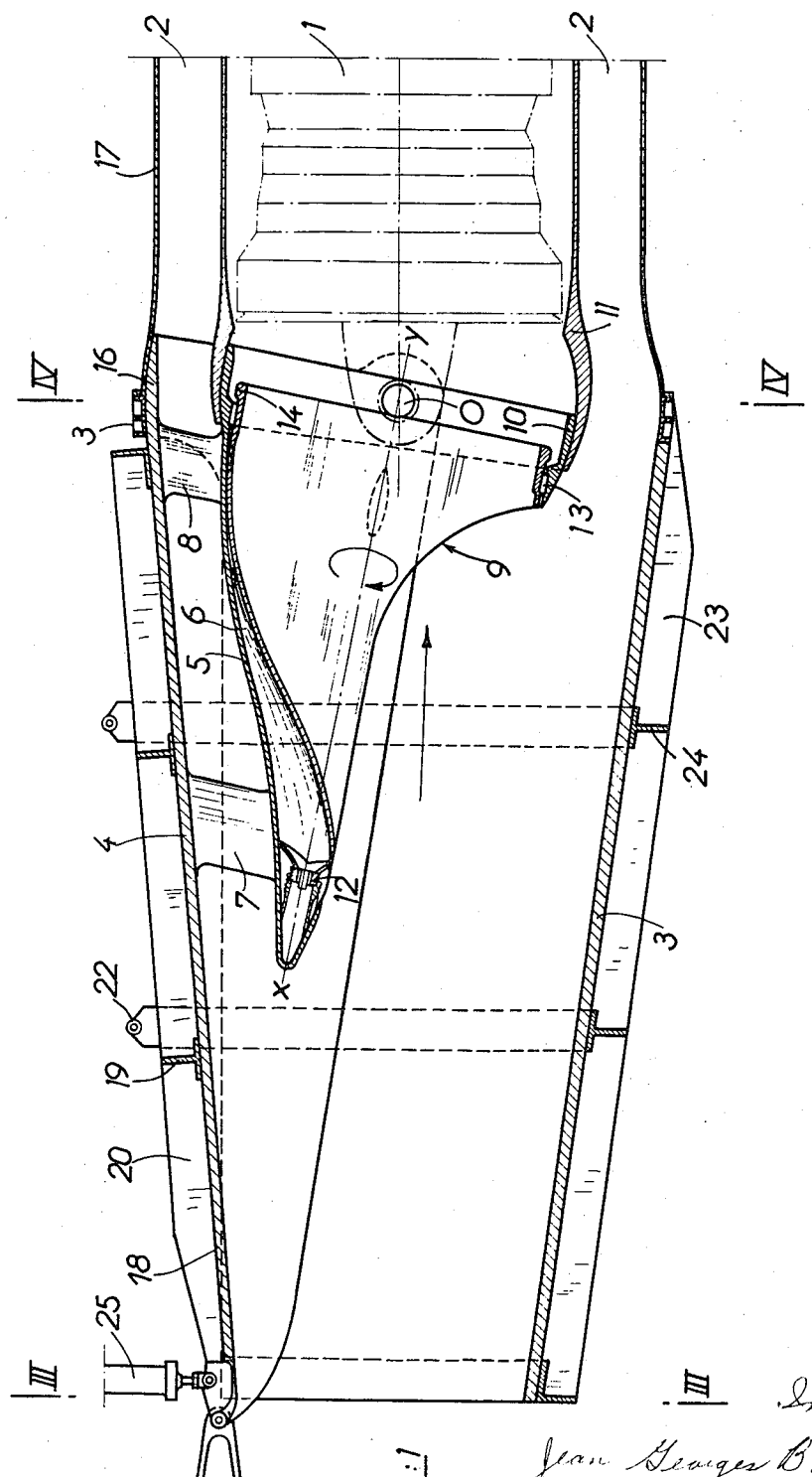

FIG. 6 comprises a view in perspective of the fixed part of the air-intake casing;

FIG. 7 comprises a view in perspective of the movable part of the air-intake casing;

FIG. 8 comprises a view in perspective of one of the parts which serve to block off the air supply to the jet turbine engine;

FIG. 9 comprises a diagrammatic view from above of the arrangement for blocking off the entry of air to the jet turbine engine, showing its drive mechanism.

According to the drawing, the air supply to a ramjet-turbine engine combination, which is not shown here, is effected by means of two ducts, a first duct 1 serving to supply the jet turbine engine with air, and an annular second duct 2 surrounding the duct 1 and feeding air to the ramjet. These parts are preceded by an air-intake casing made up of two parts 3 and 4, the part 3 being fixed and the part 4 movable about an axis perpendicular to the plane of FIG. 1 and passing through the point O, as will be explained hereinafter.

The arrangement provided to block off the duct 1 for the supply of air to the jet turbine engine in certain flight conditions is made up of a streamlined structure having the shape of a bulb and constituted by two parts 5 and 6.

The part 5 (shown in perspective in FIG. 8) is made rigid with the upper, movable wall 4 of the air-intake casing by means of the streamlined arms 7 and 8. This part has a curving excision at 9 (FIG. 1).

The base 10 of the part 5 possesses a spherical external form which renders possible a hinging movement about an axis perpendicular to the plane of FIG. 1 passing through the point O located at the centre of the duct 1. With the feature in view, the inner envelope 11 of the duct 2 for supplying air to the ramjet likewise possesses a spherical form.

The part 6 is accommodated inside the part 5, its external form being conjugate with the internal form of the part 5. It is capable of being given with a rotational movement about the axis XY passing through the point O and perpendicular to the base of the part 5. With this feature view, the part 6 is centred upstream by a stop 12 housed in the ogival termination of the part 5, and is centred downstream by means of a roller-bearing 13 matching the inside of the base 10 of the self-same part 5.

The rotation of the part 6 is controlled (FIG. 9) by a serrated sector 14 which meshes with a bevel pinion 15 whose axis of rotation coincides with the pivoting axis passing through O.

The controlled rotation of the part 6 has the effect of causing the said part to turn, thus blocking off the excision 9 (FIG. 2), a situation which corresponds to the ramjet alone being operative.

As has been stated hereinbefore, the part 5 is rigid with the movable part 4 of the air-intake casing. It is consequently able to pivot about the axis O, a ball joint 16 ensuring the join of the movable part 4 with the lip of the part 3 and the outer casing 17 on which it is mounted by means of the flange 30.

As can be seen in FIGS. 6 and 7, the form of the parts 3 and 4 which constitute the air-intake casing evolves in a continuous manner so that the section which is circular level with the cross-sectional line IV—IV becomes virtually rectangular at the intake, level with the cross-sectional line III—III.

The parts 3 and 4 are capable of receiving a honeycomb structure 18.

The movable part 4 is preferably reinforced by transverse ribs 19 and longitudinal ribs 20. The displacement of this part is controlled by an appropriate arrangement constituted by a jack 25 in the example shown here.

The fixed part 3 of the air-intake casing has, level with the cross-sectional line III—III, a U-shaped form the lateral walls 21 of which are held together by struts 22 which ensure that the whole assembly will remain mechanically stable when subjected to pressure. It is reinforced, as is the part 4, by longitudinal ribs 23 and transverse ribs 24.

The control of the jack 25 brings about the displacement of the movable part 4 of the air-intake casing and of the outer part 5 of the bulb which is rigid with the air-intake casing. The result of this is a rotation of the serrated ring 14 about the bevel pinion 15 and consequently a derivative rotation of the part 6 about the axis XY, something which is not inconvenient if the outer bulb 5 amply covers the orifice of the inner bulb 6 which is driven round by the bevel gear 15 independently of the working of the jack 25.

Given that the parts 4 and 5 are rigid one with the other, the capture of air required for the operation of the jet turbine engine always takes place in the central portion of the air-intake casing.

It is apparent that the embodiment described is only an example and that various modifications thereof are possible within the scope of the invention, as defined by the appended claims.

What is claimed is:

1. A controllable air-intake system for a turboramjet unit having a central turbojet air-inlet duct (1), a peripheral ramjet air-inlet duct (2), and a tubular inlet extension (3-4) common to both said ducts and projecting forwardly therefrom to end with a front inlet capture area (III—III), wherein the improvement comprises a hollow adjustable bulb-shaped device having a wide base portion (10) fitted at the entrance of said central duct (1), and a forwardly tapering body portion projecting into and in inwardly spaced relation with said inlet extension (3-4) to define therewith an annular passage leading into said peripheral duct (2), said body portion comprising two conjugate wall elements (5, 6) rotatable relatively to each other about an axis (XY) generally perpendicular to said base portion (10) between an obturating position wherein said conjugate wall elements (5, 6) circumferentially extend each other to form a plug blocking said central duct (1) and a passaging position wherein said conjugate wall elements (5, 6) circumferentially overlap each other to allow communication (9) through said hollow bulb-shaped device of said central duct (1) with said inlet extension (3-4).

2. Air-intake system as claimed in claim 1, wherein said hollow bulb-shaped device is bodily pivotable about an axis (O) substantially perpendicular to said rotation axis (XY).

3. Air-intake system as claimed in claim 2, wherein said central duct (1) and said peripheral duct (2) are substantially coaxial, and said rotation axis (XY) is inclined with respect to the common axis of said ducts (1, 2) when said conjugate wall elements (5, 6) are in said passaging position (FIG. 1).

Figure 2:
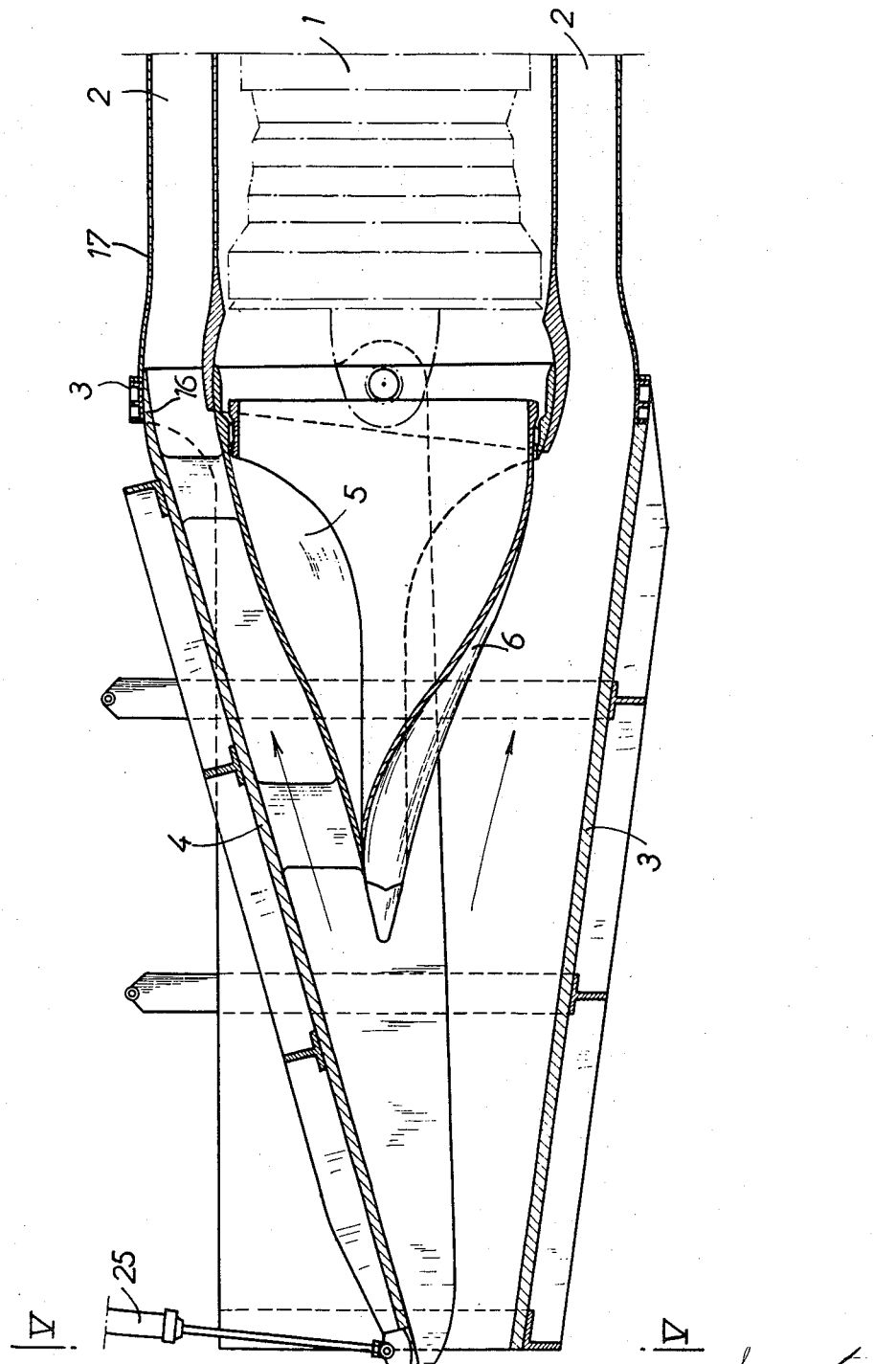

4. Air-intake system as claimed in claim 3, wherein said rotation axis (XY) substantially coincides with said common duct axis when said conjugate elements (5, 6) are in said obturating position (FIG. 2).

5. Air-intake system as claimed in claim 2, wherein said base portion (10) and said entrance of said central duct (1) comprise respective part-spherical sections (13) in ball-and-socket fitting relation.

6. Air-intake system as claimed in claim 1, wherein said base portion (10) is adjustably fitted at said entrance of said central duct (1) whereby said hollow bulb-shaped device is bodily movable with respect thereto, wherein said tubular inlet extension (3-4) comprises two opposite walls in adjustable space relationship, at last one (4) of said walls being movable to vary said front inlet capture area (III—III/V—V), and wherein said hollow adjustable bulb-shaped device is fast with said movable wall.

7. Air-intake system as claimed in claim 6, wherein said hollow bulb-shaped device and said movable wall (4) are bodily pivotable about an axis (O) substantially perpendicular to said rotation axis (XY).

8. Air-intake system as claimed in claim 7, wherein said pheripheral duct (2) and said movable wall (4) comprise respective part-spherical sections (16) in ball-and-socket fitting relation.

9. Air-intake system as claimed in claim 6, wherein said tubular inlet extension (3-4) has a gradually changing design which evolves rearwardly from a generally rectangular cross section at said front inlet capture area (III—III) to a generally circular cross section at the junction (IV—IV) of said tubular inlet extension with said air-inlet ducts (1, 2).

References Cited

UNITED STATES PATENTS

| 2,970,431 | 2/1961 | Harshman | 60—39.33 |
| 3,153,904 | 10/1964 | Ellis | 60—244 |
| 3,176,462 | 4/1965 | Eckert | 60—244 |
| 3,296,800 | 1/1967 | Keenan | 60—244 |
| 3,324,660 | 6/1967 | Lane | 60—244 |

DOUGLAS HART, Primary Examiner

U.S. Cl. X.R.

60—39.33; 137—15.1